United States Patent [19]

Richard et al.

[11] Patent Number: 4,638,838

[45] Date of Patent: Jan. 27, 1987

[54] HYDROPNEUMATIC ACCUMULATOR

[75] Inventors: Philippe Richard, Bures sur Yvette; Jean-Charles Papillon, Fontenay le Fleury; Alain Guyot, Les Loges en Josas; Carlo Corbellini, Sausset les Paris, all of France

[73] Assignee: Commissariat a l'Energie Atomique, Paris, France

[21] Appl. No.: 633,920

[22] Filed: Jul. 24, 1984

[30] Foreign Application Priority Data

Aug. 4, 1983 [FR] France ................................ 83 12895

[51] Int. Cl.[4] ................................................ F16L 55/04

[52] U.S. Cl. ......................................... 138/30; 138/26; 181/227

[58] Field of Search .................. 138/26, 30; 220/87 B; 181/227

[56] References Cited

U.S. PATENT DOCUMENTS

| | | | |
|---|---|---|---|
| 2,760,518 | 8/1956 | Peet | 138/30 |
| 2,764,537 | 9/1956 | Bunch et al. | |
| 2,874,721 | 2/1959 | Mercier | |
| 3,279,499 | 10/1966 | Mercier | 138/30 |
| 3,322,154 | 5/1967 | Mercier | 138/30 |
| 3,741,250 | 6/1973 | Mercier | 138/30 |
| 3,744,527 | 7/1973 | Mercier | |

FOREIGN PATENT DOCUMENTS

| | | | |
|---|---|---|---|
| 942447 | 2/1949 | France | |
| 73894 | 9/1960 | France | |
| 1487445 | 5/1967 | France | 138/30 |
| 95063 | 6/1970 | France | |

*Primary Examiner*—James E. Bryant, III
*Attorney, Agent, or Firm*—Oblon, Fisher, Spivak, McClelland, & Maier

[57] ABSTRACT

It has an inlet and an outlet, a bag made from a flexible, deformable material insulating the inlet from the outlet, a liquid contained in the bag on the outlet side, a transfer tube with openings on its side wall and closed by an end plug. Diffusers are positioned on the transfer tube with a given spacing, so as to leave a passage for a gas between two successive diffusers, each diffuser comprising a frame externally surrounded by an elastomer ring.

11 Claims, 7 Drawing Figures

HYDROPNEUMATIC ACCUMULATOR

BACKGROUND OF THE INVENTION

The present invention relates to a hydropneumatic accumulator having a bag and an acoustic filter.

An accumulator comprises a body generally made from steel, a bag generally made from elastomer and placed in said body and a transfer tube. A liquid is contained in the body. The accumulator makes it possible at any time to place this liquid under pressure for performing a given task. For example, it is used for machine tool locking devices, for braking or uncoupling devices for vehicles or public works machines, etc. It is also used on a nuclear reactor for injecting boron-containing water into the primary circuit in the case of an incident.

The invention relates to a hydropneumatic accumulator having a bag, comprising a body having an inlet and an outlet, a bag made from a flexible, deformable material insulating the inlet from the outlet, a liquid contained in the bag on the outlet side, a tube containing openings on its side wall and closed at its end and a diffuser assembly mounted around the tube.

Hydropneumatic accumulators of this type are known from GB-A No. 1 118 129 and U.S. Pat. No. 3,161,208. In such accumulators, the diffuser assembly is constituted by a helical spring, whose wire has a circular, triangular or rectangular cross-section. A plug is fixed to the free end of the spring.

These devices suffer from the disadvantage of clogging risks. There is also a risk of the bag fracturing.

To obviate these disadvantages, FR-A No. 1 408 181 provides hydropneumatic accumulators having a transfer tube constituted by a diffuserholder tube having holes and fritted bronze diffusers mounted with elastomer inserts on the diffuser-holder tube. However, a construction of this type suffers from serious disadvantages. Thus, the gas, e.g. compressed air, injected into the bag contains oil droplets. Under the action of pressure, these droplets are finely atomized in the gas, in the manner in which this takes place in a diesel injector and can give rise to an explosive or "auto-igniting" mixture. This mixture can explode under the effect of the pressure increase and can lead to the accumulator body or its pipes exploding.

SUMMARY OF THE INVENTION

The invention solves the problem consisting of producing a hydropneumatic accumulator in which the explosion risks, particularly by the diesel effect, are eliminated or at least considerably reduced, and in which the risks of the bag rupturing are eliminated. This result is obtained through the diffuser assembly being made from a flexible material similar to that of the bag and has openings with a large passage cross-section compared with that of the openings in the tube.

The advantages resulting from this invention are particularly due to the fact that there is no deterioration of the bag when it is in contact with the diffuser assembly. In addition, a large passage cross-section is provided for the gas. There is no atomization of the oil droplets and consequently no explosive mixture forms. The explosion risks are consequently considerably reduced.

Moreover, in the case of hydropneumatic accumulators with a bag, a supplementary problem occurs when a counterpressure is exerted on the latter. For example, this takes place when the accumulator is filled with water after flushing. The bag can be punctured under the effect of the pressure applying it to the diffusers. In the case of a nuclear reactor, said pressure is very high and is approximately 150 to 200 bars.

Thus, the invention also aims at solving the problem consisting of producing a hydropneumatic accumulator in which the bag is not damaged, particularly by punturing, under the effect of a fluid/fluid counterpressure exerted thereon. These fluids can be a liquid or a gas.

According to the invention this problem is solved in that the openings in the diffusers are open when the pressure prevailing within the transfer tube exceeds the pressure prevailing within the bag whilst said openings are closed when the pressure prevailing in the transfer tube is below that outside the bag. This result is obtained by the deformation of the diffusers under the action of the counterpressure. This result can be achieved by several different constructional forms. In particular, according to a preferred embodiment, each diffuser comprises a frame externally surrounded by an elastic ring, the frame having a male cone section, the elastic ring having a female cone part with a larger diameter than that of the male cone, two diffusers being placed on the diffuser-holder tube with a given spacing, so as to give a passage to the fluid between two successive diffusers.

The invention also relates to an acoustic filter using the same diffusers as the hydropneumatic accumulator.

Thus, the invention specifically relates to an acoustic filter comprising a body having an inlet and an outlet, a tube having openings connecting the inlet to the outlet of the body and used for the circulation of a liquid, a bag made from a flexible deformable material surrounding the tube and defining a chamber for a pressurized gas, wherein it comprises a diffuser assembly mounted around the tube, said diffuser assembly being made from a flexible material similar to that of the bag and having openings with a large passage cross-section compared with that of the openings in the tube.

Preferably, the diffuser assembly is constituted by diffuser rings mounted on the tube with a given spacing, so as to provide an annular passage for a fluid between two successive diffuser rings.

BRIEF DESCRIPTION OF THE DRAWINGS

The invention is described in greater detail hereinafter relative to non-limitative embodiments and with reference to the attached drawings wherein show.

DETAILED DESCRIPTION OF THE PREFERRED EMBODIMENTS

Figure 1:
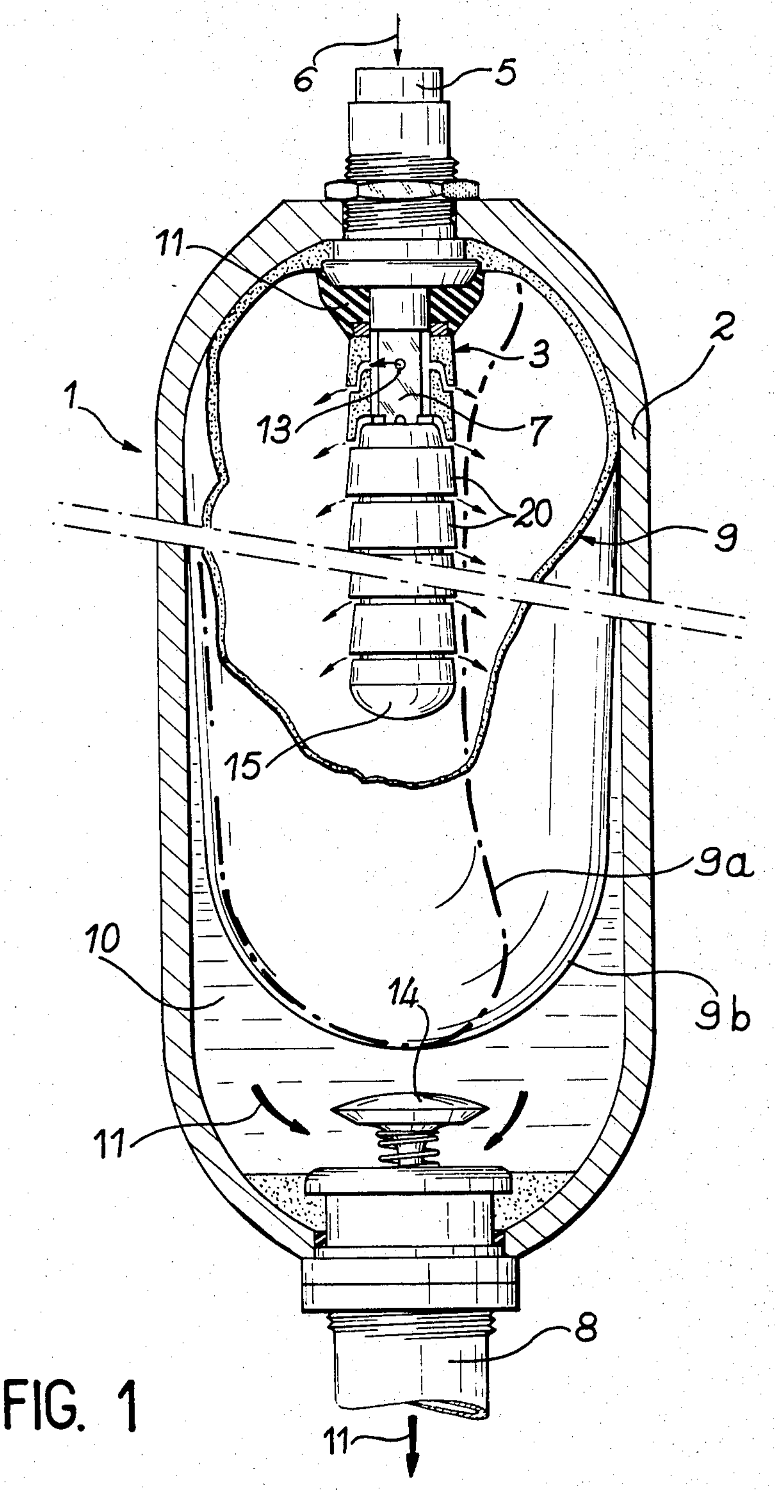
FIG. 1 a general sectional view of a hydropneumatic accumulator according to the invention.

FIG. 1 is a sectional view of a hydropneumatic accumulator comprising a steel body 1 in the form of a cylinder and terminated by a hemispherical cover on each of its ends. One of the ends, shown in the upper part of FIG. 1, has a transfer tube or diffuser-holder tube, which has two ends. The first end 5 is connected to a gas supply duct indicated by arrow 6. The second end 7 is located within a bag 9 made from an elastomer material, such as Perbunan. A tight connection 11 is provided between the transfer tube and the bag. The seal is provided by means of a ring 11, which is also made from Perbunan. The transfer tube end 7 has regularly distributed openings 13. The end is closed by a plug 15.

The position of the compressed bag is diagrammatically indicated by the mixed line 9*a*. In this position, it has a clover-shaped section along a plane perpendicular to the longitudinal axis of the diffuser and is supported on the transfer tube.

When a fluid is injected through duct 6, the bag expands in the manner indicated by profile 9*b* until it occupies the entire volume of the body. Simultaneously, liquid 10 is expelled out of the body by duct 8 (arrows 11). At the end of the travel, the bag closes valve 14.

The diffuser-holder tube as shown in FIG. 1 carries diffuser rings 20, whose function is to distribute the pressure within bag 9.

According to the invention, they are constituted by rings 23 threaded on to the diffuser-holder tube 7. Two consecutive rings 20 are arranged with a spacing opposite to the openings 13 in tube 7. Thus, the fluid flows through openings 13, as shown by arrows 16, then into the space between two successive rings, as indicated by arrows 19. Preferably, each diffuser ring 20 is constituted by a frame 21 externally surrounded by an elastomer ring 23. According to another embodiment, the metal frame can be made in one piece, which then replaces the diffuser-holder tube. Frame 21 has a male cone part 25 connected by a rounded portion. The outer ring 23 has an inner cone 27, whose diameter is larger than the diameter of the male cone 25, so as to leave a space between these two cones when the rings are mounted on the diffuser-holder tube. The spacing between two successive rings is ensured by means of teeth 29 on the terminal part of the frame and as can be more particularly seen in FIG. 3. The gas flows through the space left free between spacers 29.

In the embodiment described, the spacers 29 are constituted by projections formed on the end of frame 21 and being shaped like teeth. However, the spacers 29 could also be constituted by one or more independent parts.

Figure 3:
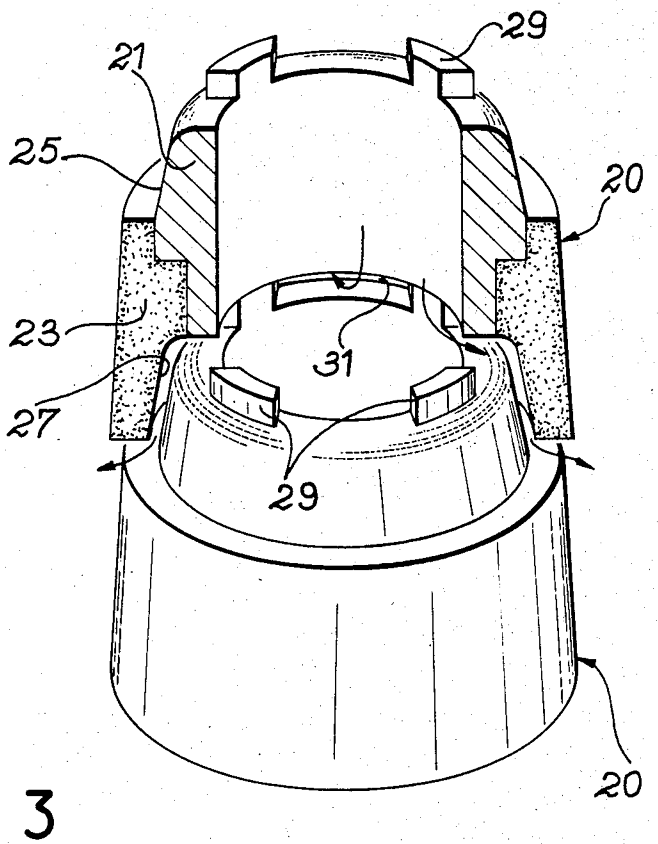
FIG. 3 a perspective and part sectional view of two rings to be threaded on to the diffuser-holder tube of a hydropneumatic accumulator.

FIG. 3 is a perspective and part sectional view of two superimposed diffusers. The diffuser ring 20 shown in the upper part of FIG. 3 is seen in longitudinal section. The teeth 29 formed at the end of frame 21 can be particularly clearly seen. The inner diffuser ring 20 shown in the lower part of FIG. 3 is shown from the outside. It is possible to see the passage cross-section left free between the outer cone of the inner diffuser ring 20 and the inner cone formed in elastomer ring 23. In the described embodiment, there are four teeth 29 defining four passages 31 for the gas. Obviously, this number could differ in another construction. For example, there need only be three teeth 29. It is also pointed out that two consecutive rings can have a random orientation relative to one another.

Figure 2:
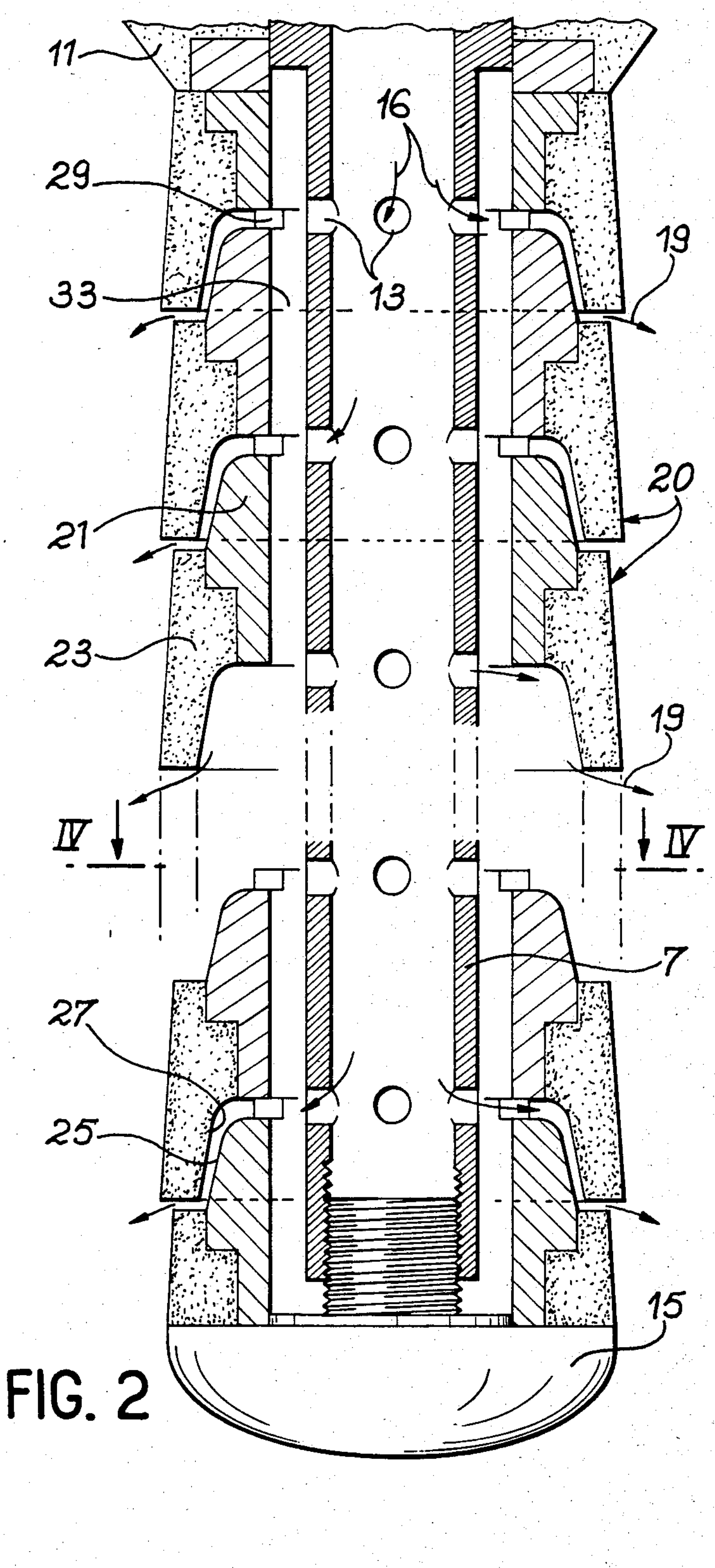
FIG. 2 a larger scale sectional view of the transfer tube of a hydropneumatic accumulator constructed according to the invention.
Figure 4:
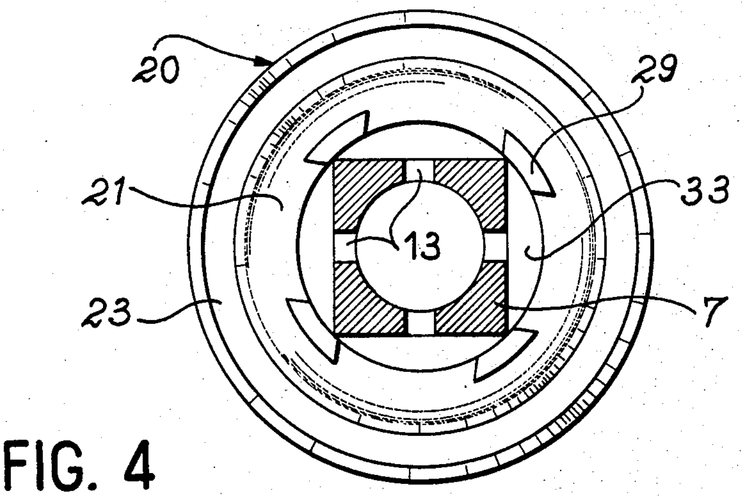
FIG. 4 a sectional view along line IV—IV of FIG. 2 of the transfer tube.

In order to link the openings 13 made in the diffuser-holder tube 7 with passage openings existing between two successive diffusers 20, it is necessary to have a collector around the diffuser-holder tube. FIG. 4 is a sectional view along line IV—IV of FIG. 2 of a preferred construction of the transfer tube making it possible to easily produce such a collector. As can be seen, the diffuser-holder tube has polygonal, e.g. square external cross-section. Thus, this shape makes it possible to free four passages 33 between the faces of the square and the inner bore of frame 21. The four openings 13 at 90° of one another are made in each of the faces of the square. Each opening 13 issues into a passage 33. It is pointed out that the diffuser ring 20 has a random orientation relative to the square of the diffuser-holder tube. Thus, no matter what this orientation, there is an adequate passage cross-section for the gas. The diffuser-holder tube 13 also ensures the centering of the diffuser rings 20 on the top of the square.

Figure 5:
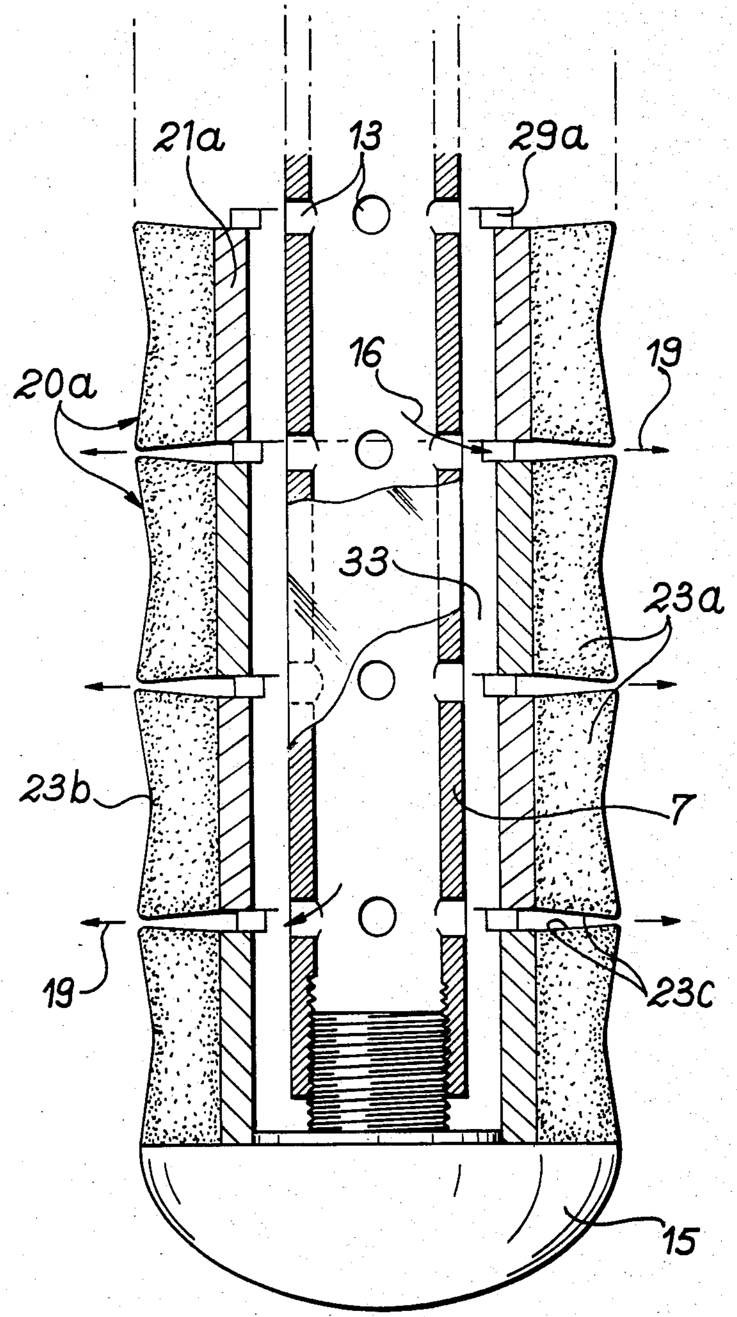
FIG. 5 a sectional view of a second embodiment of the transfer tube according to the invention.
Figure 6:
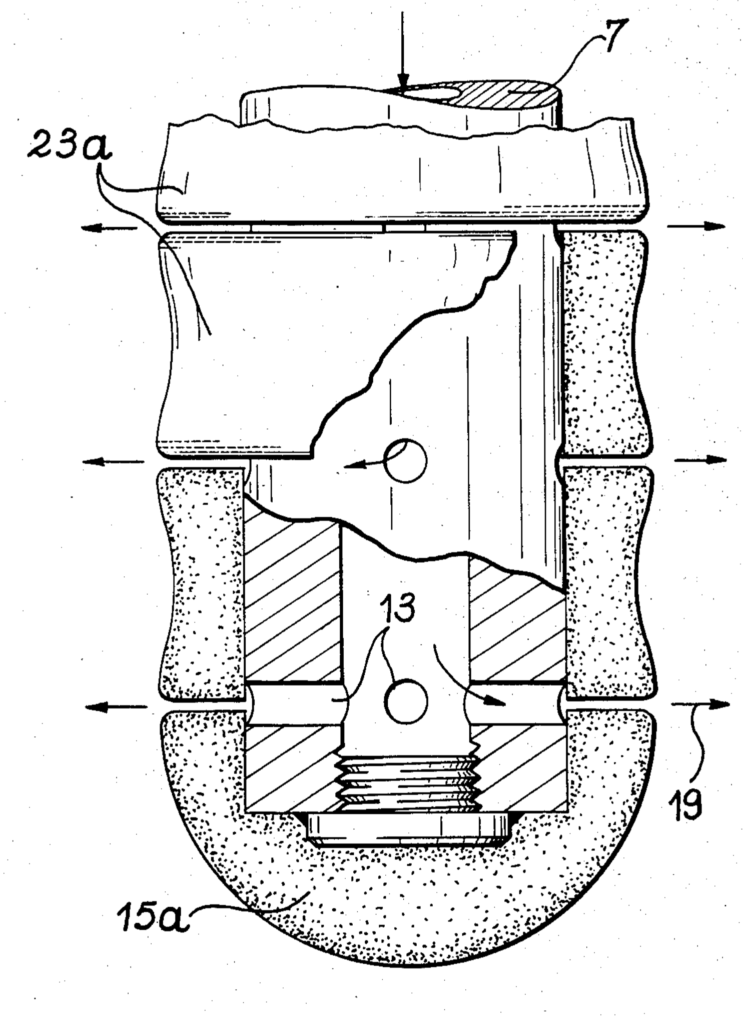
FIG. 6 a sectional view of another embodiment of the invention.

FIG. 5 is a longitudinal sectional view of a second embodiment of a diffuser according to the invention. Once again there is a diffuser-holder tube 7 with openings 13, together with the plug 15 shown in FIG. 2. The diffusers 20*a* are constituted by a frame 21*a* externally surrounded by an elastomer ring 23*a*. Each frame 21*a* has a cylindrical shape with a circular cross-section. It is centred on tube 7 having an external polygonal section. At one of its ends it has a spacer which, in the described embodiment, comprises four projections formed on frame 21*a*. Obviously, these spacers could also be constituted by joined parts. According to the variant of FIG. 6, elastomer rings 23*a* and an elastomer base 15*a* can be directly moulded on to the perforated tube 7, thus constituting a one piece transfer tube and according to another variant could all be made from an elastomer. The gas passages therein are identical to those of FIG. 2 or to those of FIGS. 5 and 6.

External ring 23*a* has a generally cylindrical shape with a circular section. It has a relatively shallow groove 23*b* with a rounded profile on its outer surface. The upper and lower faces 23*c* of ring 23*a* form with the axis of the diffuserholder tube and consequently with the axis of the diffusers a reentrant angle, i.e. less than 90°. For example, this angle can be equal to 75°. Thus, the faces of the two successive tubes 23*a* move towards one another and leave for the fluid a discharge space which is narrower than the intake space, as indicated on FIG. 5. These edges consequently form lip-like portions.

The rings 23*a* are made from a material which is compatible with that of the bag, so that the latter is not subject to wear or damage when applied to the diffuser tube. They are made from the same material as the latter, namely an elastomer. In order to further reduce explosion risks, the elastomer has carbon rings 23*a*, so as to make them electrically conductive, which eliminates static electricity and consequently the risk of "self-ignition". Naturally, this arrangement also applies to the first embodiment described relative to FIGS. 1 to 4.

In the embodiment of FIG. 5, the space left free for the fluid is not completely closed, when a counterpressure is applied to the bag. This space remains at least partly open, but the nature of the materials present makes it possible to avoid puncturing of the bag, so that the latter can withstand a fluid/fluid counterpressure exceeding 250 bars.

The invention has the following advantages. The transfer tube brings about a limited pressure drop, which is well below that existing in fritted diffusers. It cannot be clogged, particularly by oil droplets suspended in the gas and the impurities which may be contained in the liquid, due to the large passage cross-section offered to the fluid. It supplies the fluid to bag 9 at a reduced speed and without any atomization of any oils which may be present. It does not act as a filter or an oil trap. It can withstand fluid/fluid counter-pressures exceeding 250 bars without permanent deformation and without damage. It leads to no damage to bag 9, when the latter is applied to the transfer tube under the effect of a fluid/fluid counter pressure exceeding 250 bars.

Figure 7:
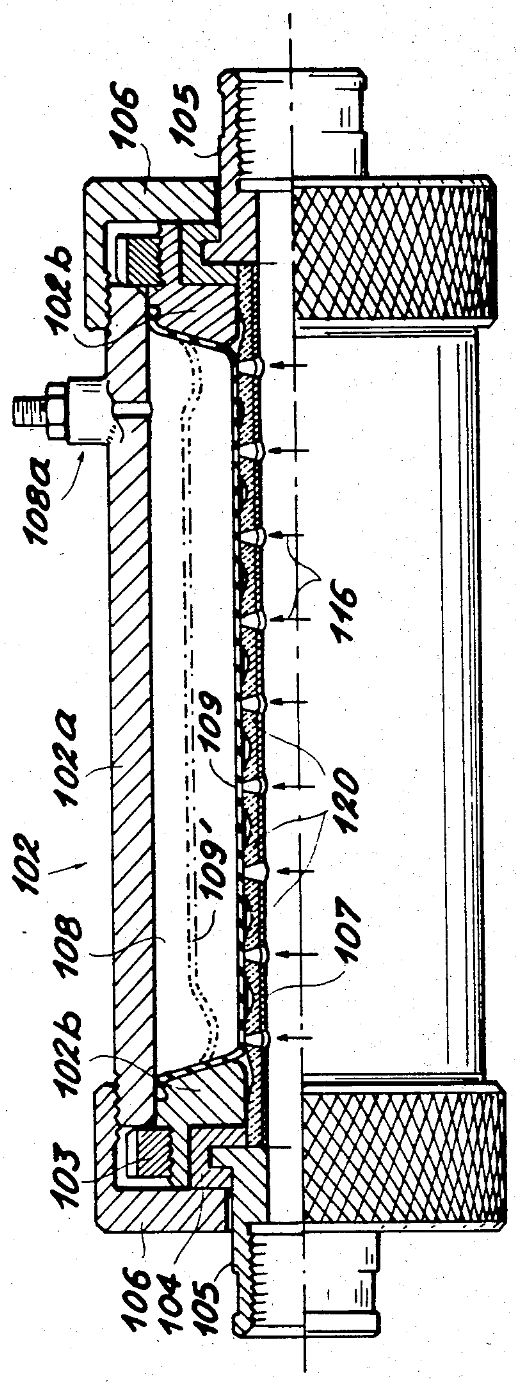
FIG. 7 a sectional view of an acoustic filter constructed according to the invention.

FIG. 7 shows an acoustic filter constructed according to the invention and which is intended to be fitted on a pipe. It is used for absorbing pressure waves, which are e.g. caused by piston pumps or other equipment. It has a body 102, constituted by a cylinder **102*a* relatively thick walls, at each of whose ends are fitted two locking screws 102*b*. A slotted nut 103 is screwed on to each of the locking screws 102*b*. A locking ring 104 is fitted into a groove of each of the locking screws 102*b*. Within the locking rings are provided couplings 105** for coupling the filter to a pipe.

At either end, a milled plug 106 is screwed on to a thread of cylinder **102*a*. A diffuser-holder tube 107 connects coupling 105 at the left-hand end of the drawing to the coupling at the right-hand end. Diffuser rings according to the invention are fitted on to tube 107. These rings 120 are constructed in an identical manner to rings 20 described relative to FIGS. 2 to 6**, so that they will not be described in detail again here.

A deformable bag 109 made from a flexible material is mounted on each of the locking screws **102*b*. This bag is shaped like a cylindrical sleeve and surrounds tube 107 and diffuser rings 120. The ends of the bag 109 are located in a corresponding slot of part 102*b*. Bag 109 defines with the inner wall of cylinder 102*a* a chamber 108 for receiving a pressurized gas. This gas is introduced by means of a valve 108*a* mounted on the wall of body 102*a***.

As was explained in connection with hydropneumatic accumulator, elastomer rings 120 make it possible to prevent perforation and wear to the bag 109, whilst permitting the free passage of a fluid, particularly a liquid circulating in the duct to which the acoustic filter is connected. When this fluid is subject to pulsations, for example when it is displaced by a piston pump, it enters the openings of tube 107 and between the diffuser rings, in the manner indicated by arrows 116. The bag then rises until it occupies a position like that designated by reference numeral 109'.

What is claimed is:

1. A hydropneumatic accumulator with a bag, comprising a body having an inlet and an outlet, a bag made from a flexible, deformable material insulating the inlet from the outlet, a liquid contained in the bag on the outlet side, a tube connected to said inlet with openings on its side wall and closed at its end and a diffuser assembly mounted around the tube, wherein the diffuser assembly is made from a flexible material similar to that of the bag and has openings with a large passage cross-section compared with that of the openings in the tube, and wherein the diffuser assembly is constituted by diffuser rings, mounted on the tube with a given spacing, so as to provide an annular passage for a fluid between two successive rings.

2. An accumulator according to claim 1, wherein the diffuser rings are shaped in such a way that the annular passages between two successive rings are open when the pressure prevailing within the tube exceeds the pressure outside the bag and are closed in the opposite case.

3. An accumulator according to claim 1, wherein each diffuser ring comprises a frame externally surrounded by an external ring.

4. An accumulator according to claim 3, wherein the frame has a male cone section, the elastomer ring having a female cone part with a larger diameter than that of the male cone.

5. An accumulator according to claim 4, wherein each diffuser ring comprises a cylindrical frame externally surrounded by an elastomer ring having lips which can move towards those of the adjacent diffuser when a hydraulic pressure is exerted from the outside on said rings.

6. An accumulator according to claim 4, including a collector surrounding the tube in order to link the openings therein with the passage openings of the diffuser ring.

7. An accumulator according to claim 1, wherein the tube has a polygonal external section, an opening being made on each face of the polygon level with the connection of two successive diffuser rings.

8. An accumulator according to claim 3, wherein the spacing between two successive diffusers is maintained by spacers formed at the end of the frame.

9. An accumulator according to claim 3, wherein the external ring of the diffuser ring is made from an elastomer material.

10. An accumulator according to claim 8, wherein the external ring has a carbon filling.

11. An accumulator according to claim 2, including an elastomer base, wherein the elastomer rings have lips which can move towards those of the adjacent ring when a pressure is exerted from the outside on said rings and like the base are moulded on to the tube.

* * * * *